(12) United States Patent
Cole

(10) Patent No.: US 11,898,692 B1
(45) Date of Patent: Feb. 13, 2024

(54) ELECTRONIC DEVICE PLATFORM

(71) Applicant: Rick Cole, Houston, TX (US)

(72) Inventor: Rick Cole, Houston, TX (US)

(*) Notice: Subject to any disclaimer, the term of this patent is extended or adjusted under 35 U.S.C. 154(b) by 0 days.

(21) Appl. No.: 18/074,315

(22) Filed: Dec. 2, 2022

Related U.S. Application Data

(60) Provisional application No. 63/285,244, filed on Dec. 2, 2021.

(51) Int. Cl.
*F16M 13/02* (2006.01)
*A47B 97/00* (2006.01)
*H04M 1/04* (2006.01)

(52) U.S. Cl.
CPC .............. *F16M 13/02* (2013.01); *A47B 97/00* (2013.01); *H04M 1/04* (2013.01)

(58) Field of Classification Search
CPC .......... F16M 13/02; A47B 5/00; A47B 21/06; A47B 97/00; H04M 1/04
USPC ....................................................... 248/314
See application file for complete search history.

(56) References Cited

U.S. PATENT DOCUMENTS

| | | | |
|---|---|---|---|
| 10,281,083 B2 * | 5/2019 | Bacallao | F16M 13/02 |
| 11,241,072 B2 * | 2/2022 | LaPoint | F16M 11/08 |
| 11,437,832 B1 * | 9/2022 | De Vincent | A47B 21/06 |
| D979,281 S * | 2/2023 | Bao | D6/521 |
| 2012/0154119 A1 * | 6/2012 | Schepps | H04M 1/0256 |
| | | | 455/575.1 |

* cited by examiner

*Primary Examiner* — Todd M Epps
(74) *Attorney, Agent, or Firm* — James M. Duncan.; Scanlon Duncan LLP

(57) ABSTRACT

A electronic device support provides a platform upon which an electronic device may be temporarily placed to prevent damage and/or contamination of the electronic device. The device has a rectangular bed sized to receive and secure the electronic device. The rectangular bed has a first side has a peripheral wall to enclose the electronic device, the peripheral wall having a length portion and a width portion. The length portion has a pair of opposite facing grab slots and the width portion has a pair of opposite facing charge slots. A socket member is attached to the second side of the rectangular bed. An arcuate arm member has a first end with male member configured to be received within the socket member. The arcuate arm member has a second end which may either be configured as a clip member or the second end may be attached to a wall-mountable face plate.

3 Claims, 10 Drawing Sheets

ELECTRONIC DEVICE PLATFORM

BACKGROUND OF THE INVENTION

The present invention relates to temporarily storing, supporting and displaying cell phones, tablets, electronic organizers, portable GPS units and other electronic devices, collectively referred to as "electronic devices".

It is no surprise that cell phones accompany the owner everywhere, including into bathrooms. It is estimated that 88% of all cell phones are occasionally operated while the user is using a toilet. Unfortunately, public rest rooms do not typically provide any proper place for placing a cell phone or tablet to reduce the likelihood of the device from contacting infected surfaces or for falling into the toilet. Common places for placing a cell phone in a public restroom are on the top of a urinal toilet tank, sink or floor—all surfaces which are loaded with germs and bacteria.

It is also known that cell phones and tablets are often used for watching video content, particularly when traveling via airplanes, trains, and other forms of public transportation. However, watching video on a cell phone typically requires leaning the phone or tablet against some structure or object to maintain the screen in an appropriate viewing position.

SUMMARY OF THE INVENTION

Embodiments of the present invention provide a platform upon which a cell phone, tablet, organizer, GPS device or other portable electronic device may be disposed for temporarily storing, supporting and displaying. The device has particular application for washrooms, locker rooms, rest rooms, and other publicly used locations where there is a concern of protecting the electronic device from falling, water damage, or from biological hazards.

One embodiment comprises a cradle member comprising a generally rectangular bed conforming to the shapes of cell phones and tablets. The bed comprises a peripheral wall which retains the cell phone or tablet from sliding off of the rectangular bed. The peripheral edge may have grab slots which penetrate through the peripheral edge and which facilitate the lifting of the device from the rectangular bed. The peripheral edge may also have slots adjacent to the charge ports for the cell phone and tablet to allow the connection of a charge cord to the device. The rectangular bed may further comprise a textured surface which raise the backside of the device from the lowermost portions of the rectangular bed. The lowermost portions of the rectangular bed may have drain holes to allow any liquid to drain from the cradle member.

The cradle member may be removably attached to an arm member. The arm member may be attached to a plate member which is removably attached to a wall or flat surface. The plate member may comprise a locking mechanism which prevents removal of the plate member to deter theft. The plate member may comprise a mounting clip which may be attached to the wall or flat surface with adhesive strips or screws or other fasteners.

In another embodiment of the invention, the arm member may comprise a mounting clip which allows the cradle to be attached to a desk or drop-down tray, thereby allowing a user to easily view the screen hands free.

DETAILED DESCRIPTION

Figure 1:
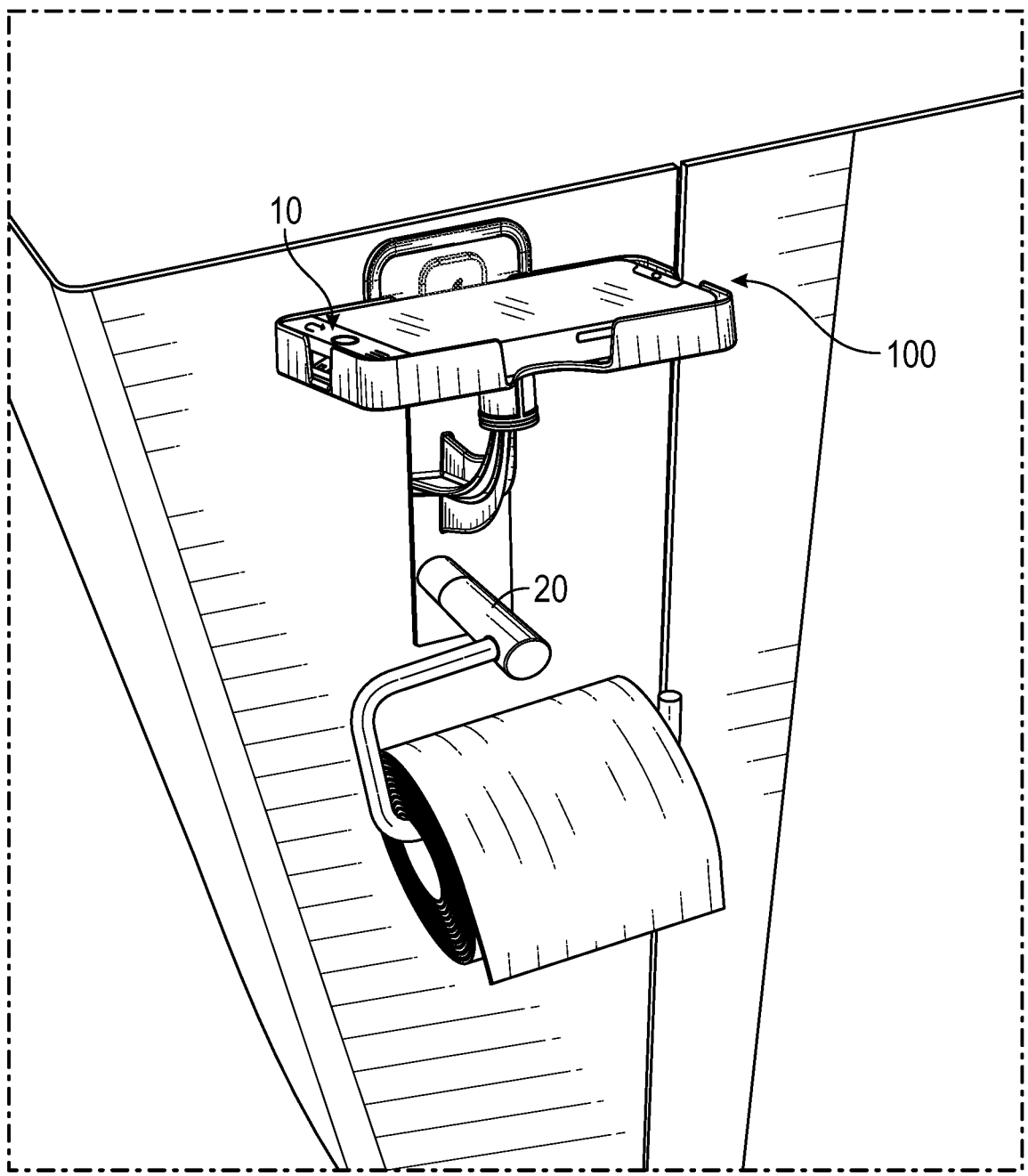
FIG. 1 depicts an embodiment of the invention supporting a cell phone in a bathroom, illustrating how the invention may provide a convenient location for temporary placement for the phone.

Referring now to the Figures, FIG. 1 depicts an embodiment of a device support 100 having an electronic device 10 disposed horizontally on the device support. As shown in FIG. 1, the device support may be placed within a rest room to provide a convenient and sanitary storage location for a portable device. As further indicated in FIG. 1, the device support 100 may be configured as an integral part of a toilet paper dispenser 20.

Figure 2:
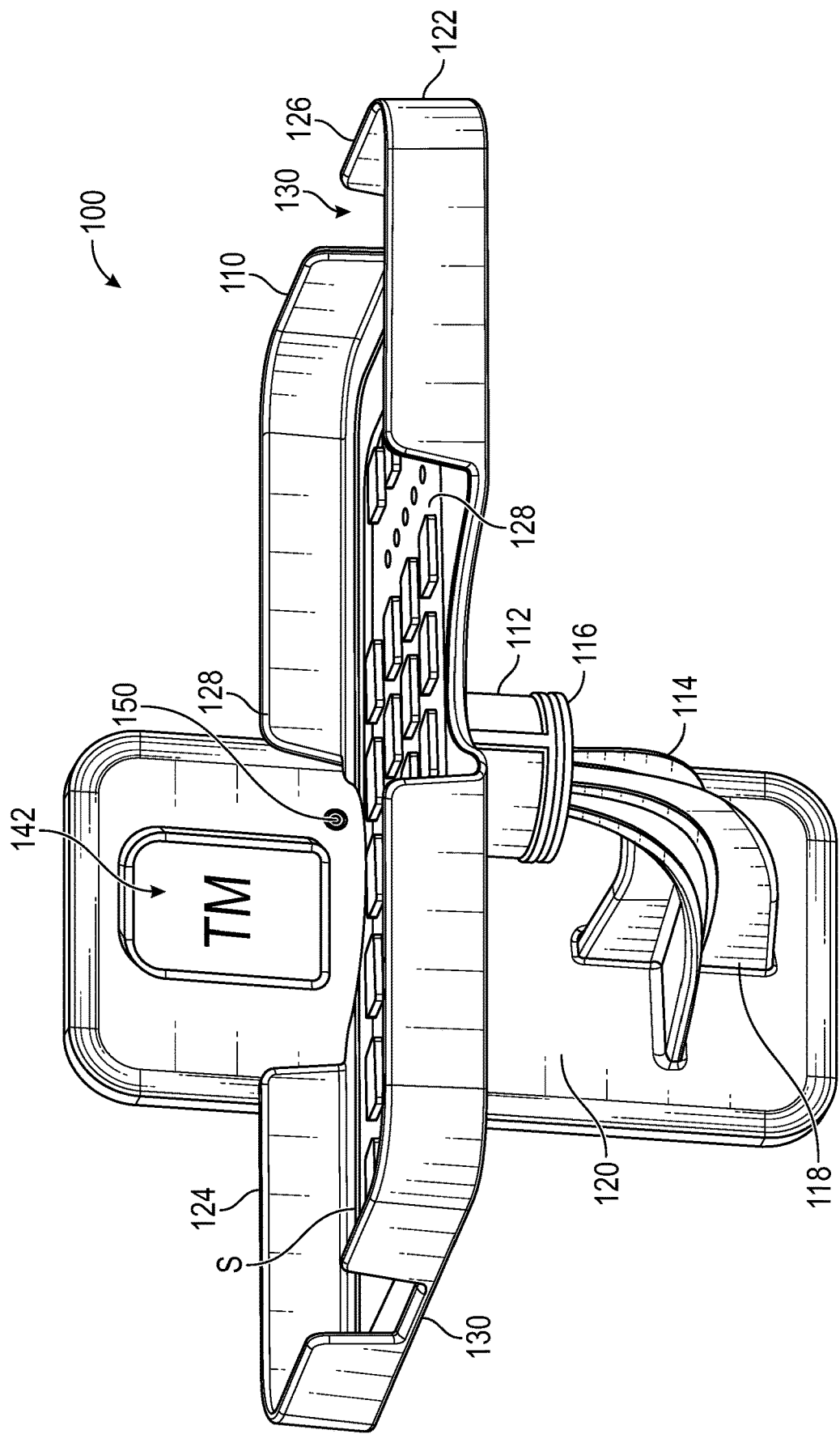
FIG. 2 shows a perspective view of an embodiment of the device showing the cradle, arm, and attachment plate.

FIG. 2 depicts an embodiment of a device support 100 of the present invention having three basic components. The three basic components are a rectangular bed member 110, a socket member 112 affixed to the bed member 110, and an arcuate arm member 114 having a male end 116 configured to be removably attached within the socket member 112. In another embodiment, a second end 118 of the arcuate arm member 114 may be removably attached to a wall mountable face plate 120.

Figure 5:
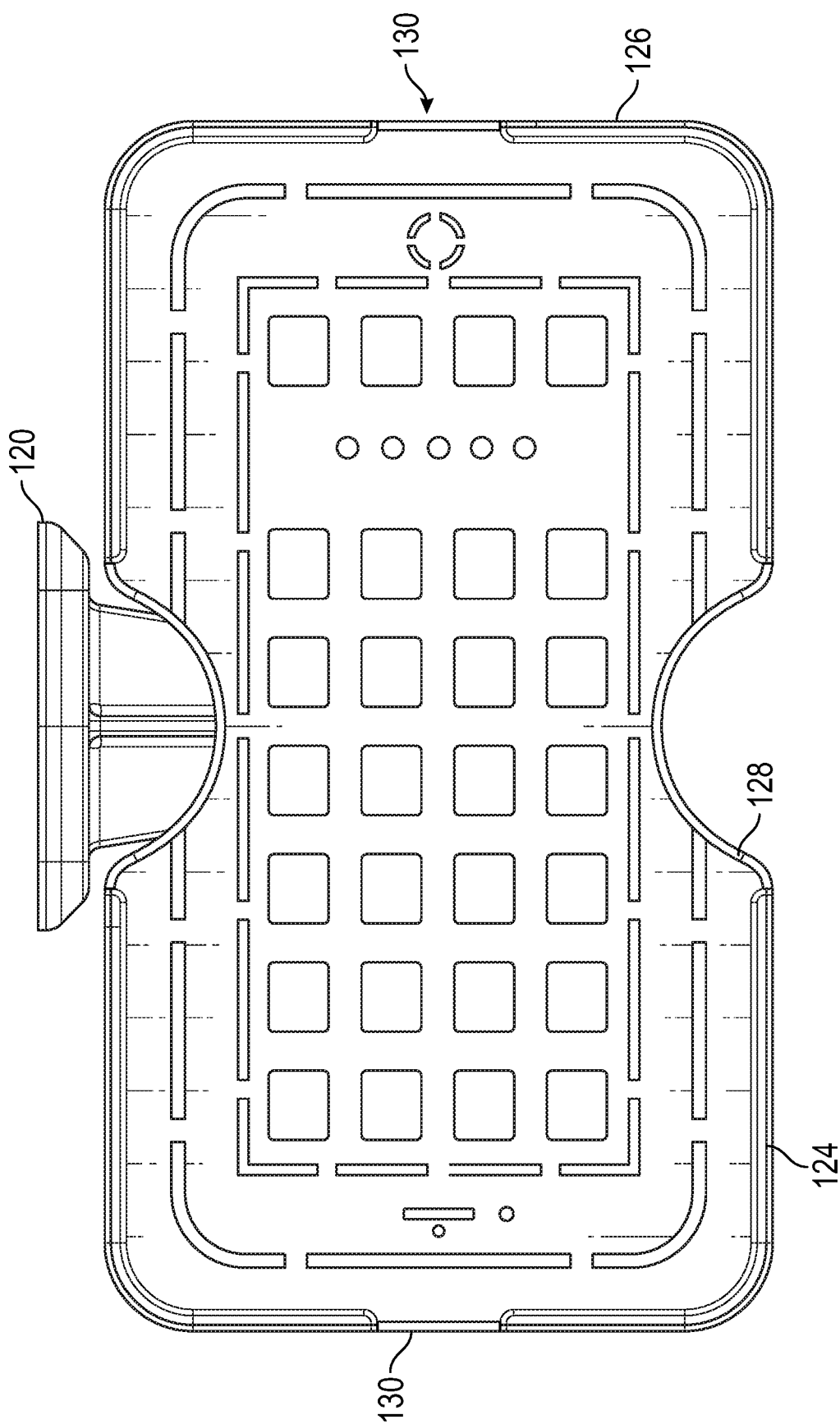
FIG. 5 shows a top view of an embodiment of the device.

Rectangular bed member 110 may be sized to receive a variety of electronic devices 10, such as cell phones, tablets, organizers, portable GPS devices, and the like, although the most common use is anticipated to be for cell phones. Rectangular bed member 110 may be configured as a cradle member which has a peripheral wall 122 sized to wrap around the edges of the electronic device 10. The peripheral wall 122 securely retains the electronic device 10 in the device support 100 to prevent the device from falling. Rectangular bed member 110 may comprise a textured upper surface S as best shown in FIGS. 2 and 5 which prevents puddling of water on the upper surface of the bed member 110. Upper surface may also comprise a removable and disposable liner which may be periodically changed out to provide greater hygiene. In addition, the upper surface S of the rectangular bed member comprise a QR code which may be scanned by a user to provide promotional or advertising material.

Peripheral wall 122 has a length portion 124 and a width portion 126. The continuity of peripheral wall 122 is interrupted along the length portion 124 by a pair of opposite facing grab slots 128. Grab slots 128 facilitate the removal of the electronic device 10 from the rectangular bed member 110 by allowing a user to place their fingers through the grab slots 128 and grasp the edges of the electronic device 10. Width portion 126 has a pair of opposite facing charging slots 130 which provide access for a charge cable (not shown) to be attached to the electronic device.

Figure 3:
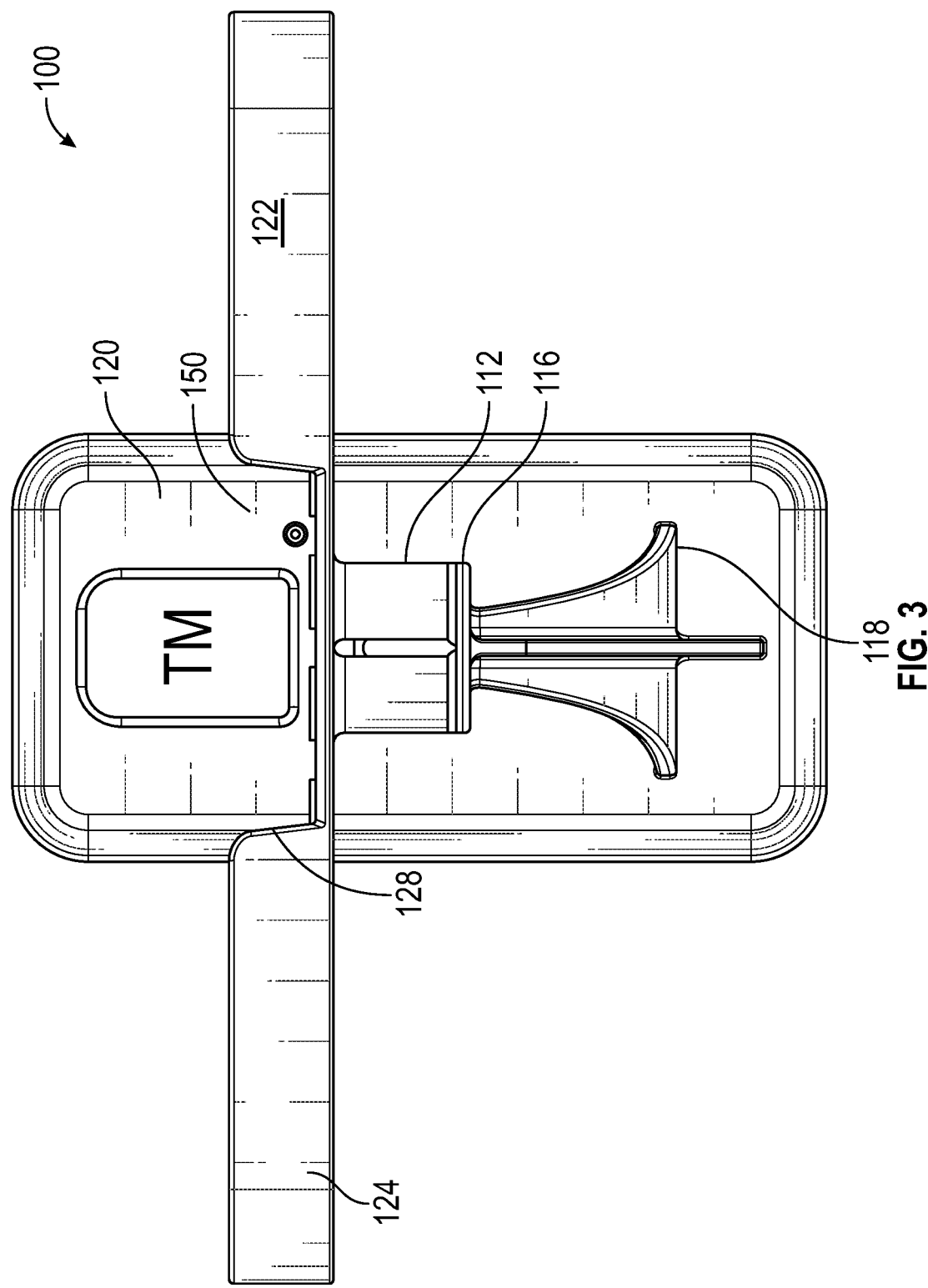
FIG. 3 shows a front view of the embodiment of the device shown in FIG. 2.
Figure 4:
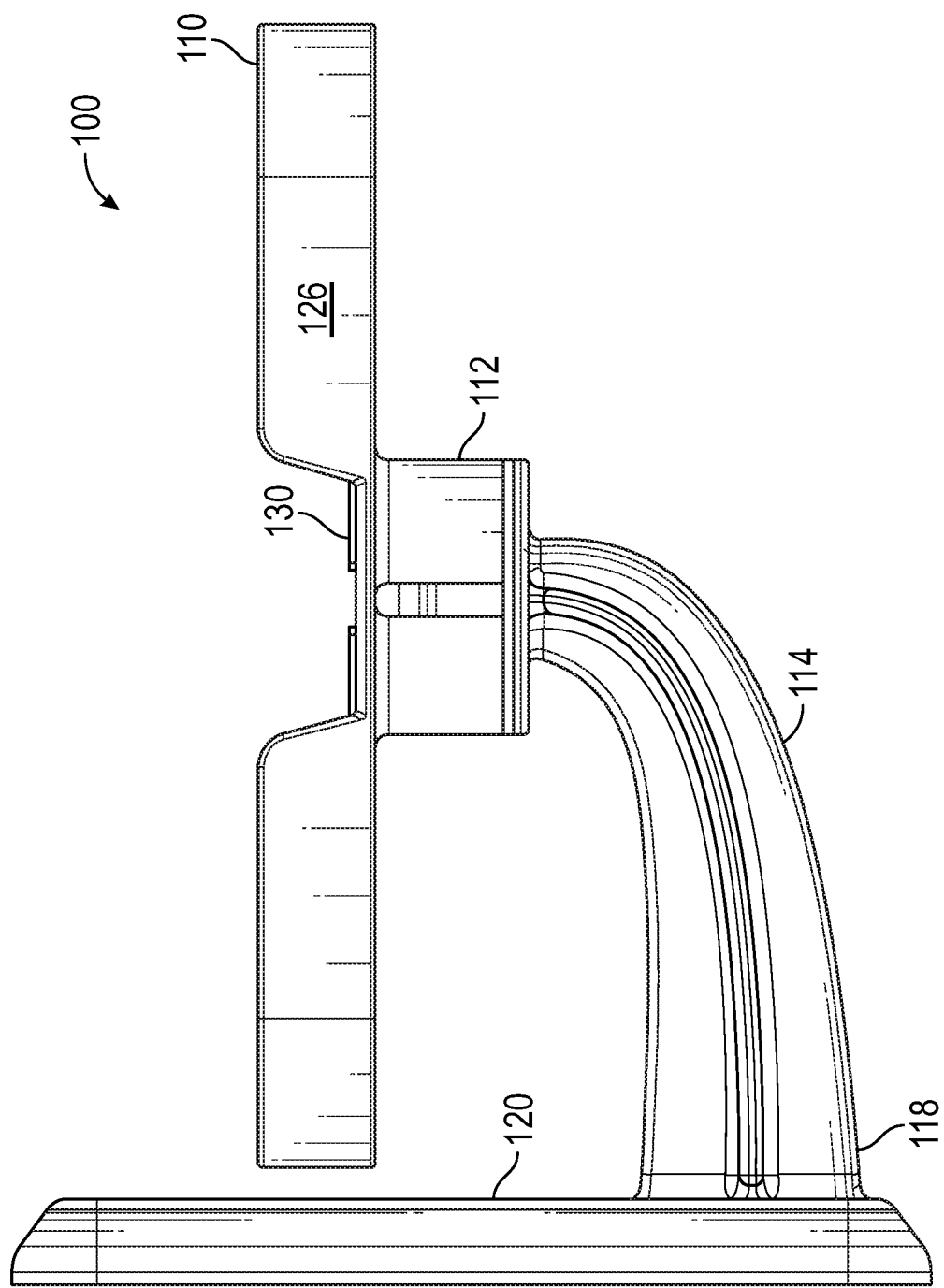
FIG. 4 shows a side view of an embodiment of the device.
Figure 6:
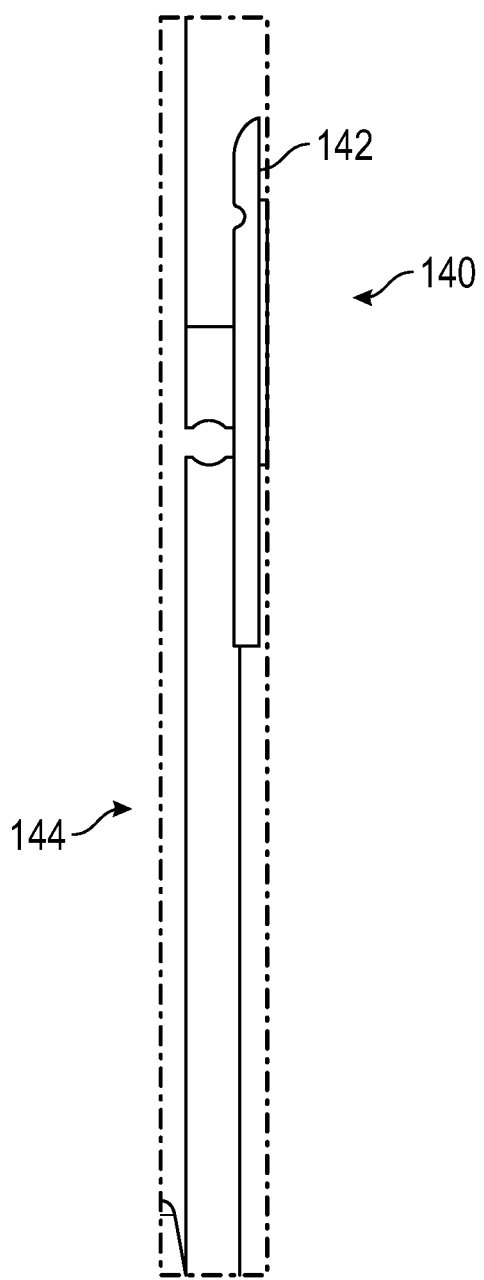
FIG. 6 shows a side view of an embodiment of a mounting plate and attachment clip.
Figure 7:
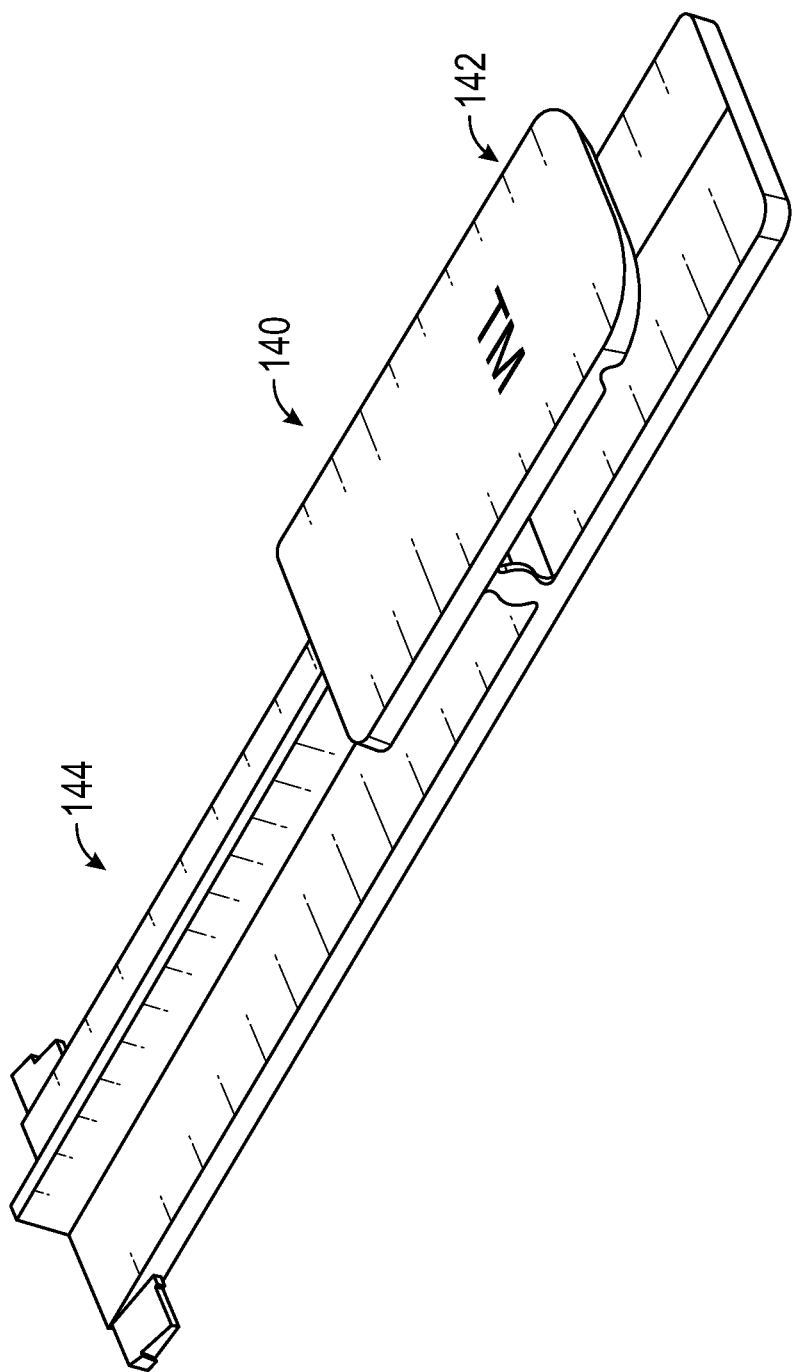
FIG. 7 shows a perspective view of an embodiment of an attachment clip.
Figure 8:
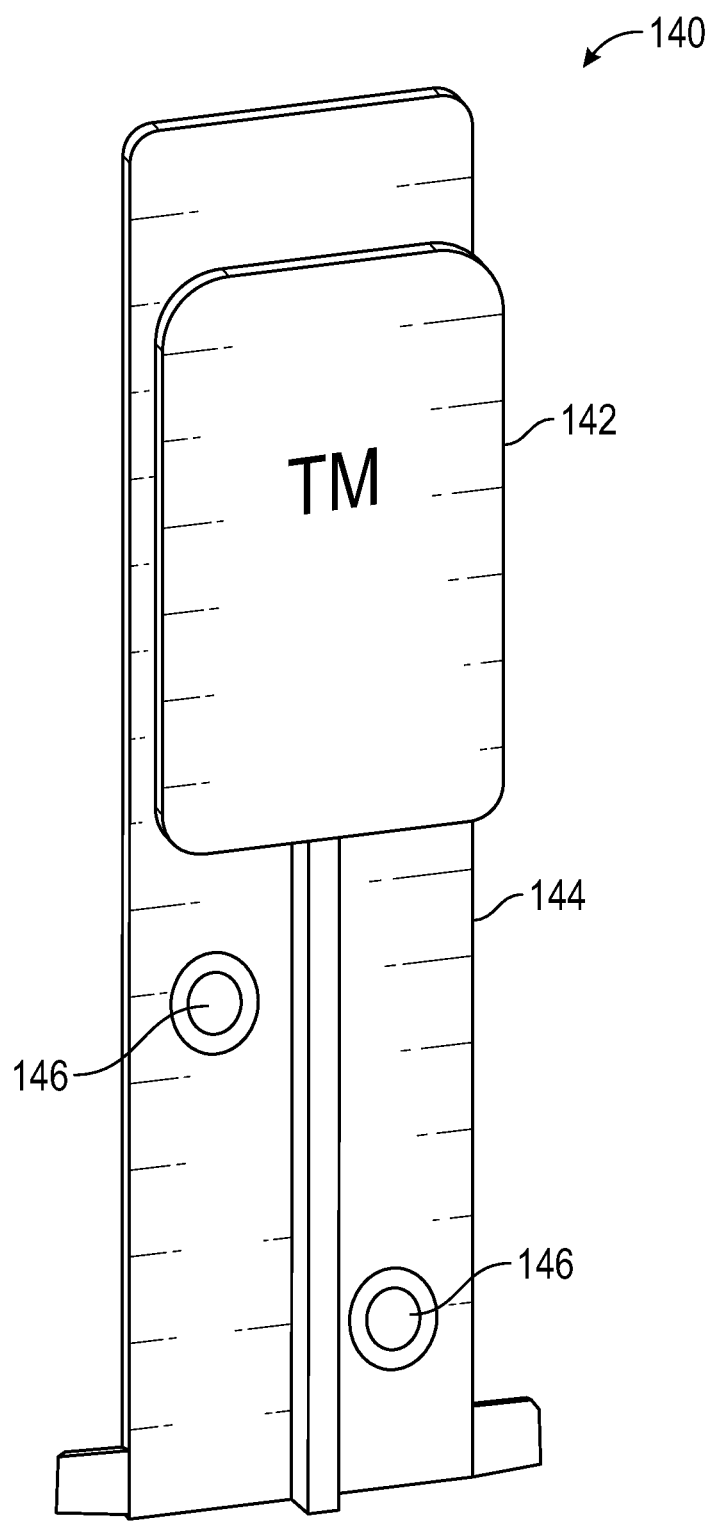
FIG. 8 shows a front view of the attachment clip of FIG. 9.

FIG. 6 depicts shows a side view of an embodiment of an anchor member 140 to which face plate 120 may be attached by a friction fit between tab member 142 and face plate 120. As indicated in the figures, tab member 142 may comprise a logo or other advertisement. Anchor member 140 comprises a backing plate 144 which may be attached to a surface, such as a wall, cabinet or other surface with screws 146 or other fasteners. As indicated in FIGS. 2-3, removal of face plate 120 from anchor member 140 may require insertion of a customized tool through locking apertures 150 to allow removal of the device support 100 from the anchor member 140 thereby discouraging theft of the device.

Figure 10:
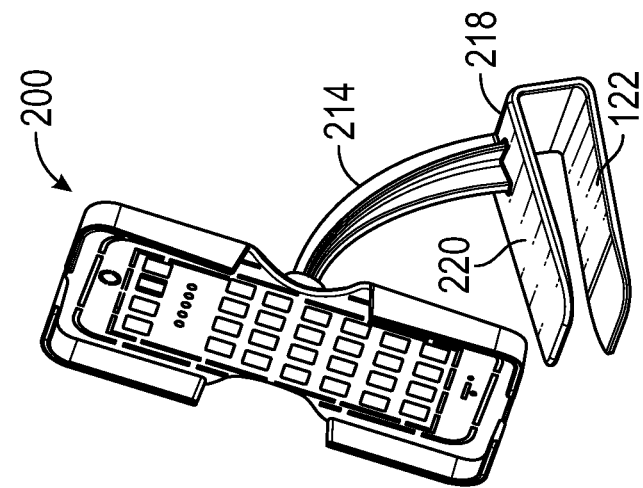
FIG. 10 shows a second perspective view of the device shown in FIG. 9.
Figure 9:
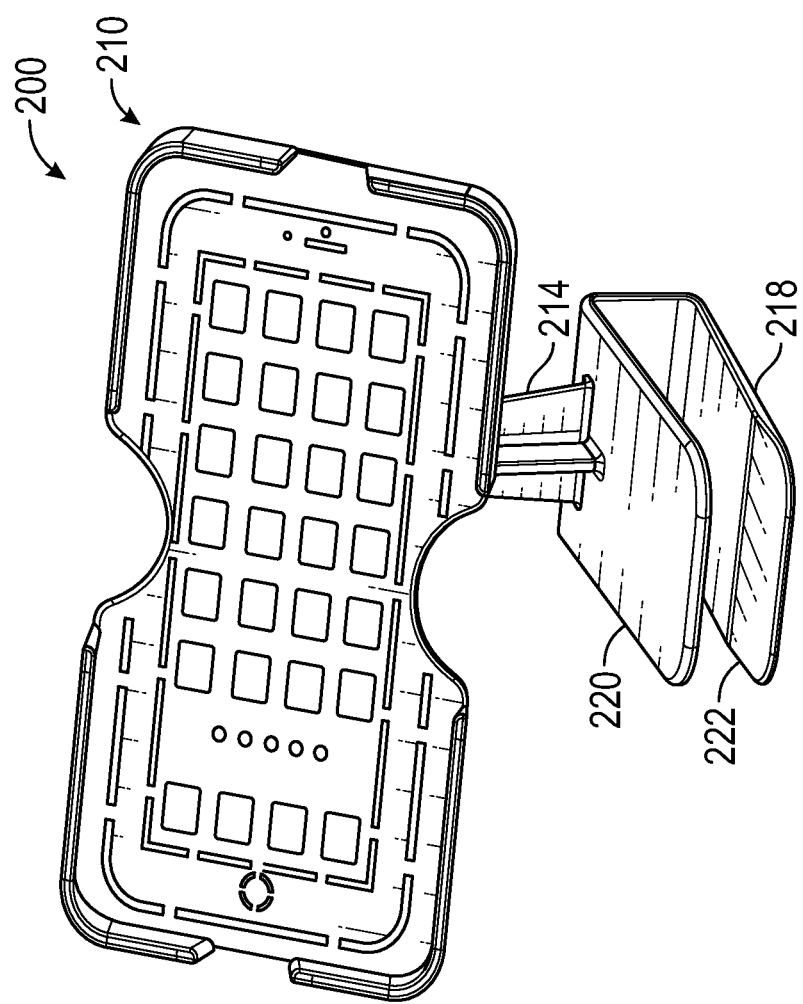
FIG. 9 shows a perspective view of embodiment of the device which may be utilized for temporarily mounting a cell phone or tablet to a desk or to a drop-down tray of an airplane, train, bus, etc.
Figure 11:
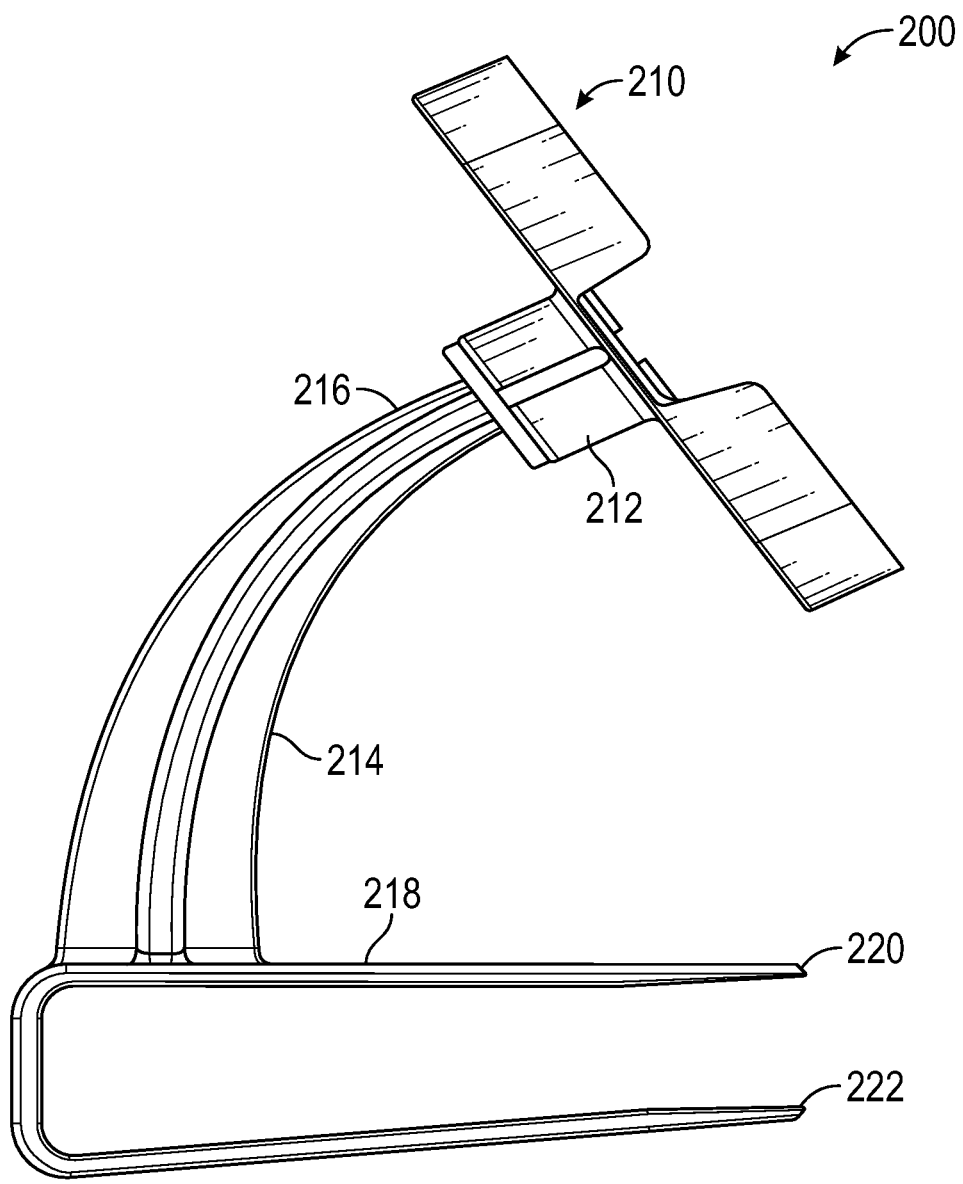
FIG. 11 shows a side view of the device shown in FIGS. 9 and 10.

FIGS. 9-11 depict another embodiment of device support 200. This embodiment of the device support comprises a rectangular bed member 210, a socket member 212 affixed to the bed member 210, and an arcuate arm member 214 having a male end 216 configured to be removably attached within the socket member 212. In This embodiment, a second end 218 of the arcuate arm member is configured as a clip member having opposite facing attachment members 220, 222. Opposite facing attachment members 220, 222 may be configured from a plastic material having an elastic modulus which allows the attachment members to be separated from the static state and secure the device support to a desk, table, counter or similar structure.

Having thus described embodiments of the invention, what is claimed as new and desired to be protected by Letters Patent includes the following:

1. A device support apparatus comprising:
a rectangular bed having a first side and a second side, the first side comprising a peripheral wall sized to enclose an electronic device, the peripheral wall having a length portion and a width portion, wherein the length portion has a pair of opposite facing grab slots and the width portion comprises a pair of opposite facing charging slots;
a socket member affixed to the second side of the rectangular bed; and
an arcuate arm member having a first end and a second end, wherein the first end comprises a male member configured to be removably attached within the socket member.

2. The device support apparatus of claim 1 wherein the second end of the arcuate arm member comprises a clip member, the clip member comprising a pair of opposite facing engagement members.

3. The device support apparatus of claim 1 wherein the second end of the arcuate arm is attached to a wall-mountable face plate.

* * * * *